United States Patent [19]

Nakabayashi

[11] Patent Number: 5,572,665
[45] Date of Patent: Nov. 5, 1996

[54] SEMICONDUCTOR INTEGRATED CIRCUIT FOR DEVELOPING A SYSTEM USING A MICROPROCESSOR

[75] Inventor: Takeo Nakabayashi, Hyogo, Japan

[73] Assignee: Mitsubishi Denki Kabushiki Kaisha, Tokyo, Japan

[21] Appl. No.: 551,355

[22] Filed: Nov. 1, 1995

Related U.S. Application Data

[63] Continuation of Ser. No. 230,932, Apr. 21, 1994, abandoned.

[51] Int. Cl.$^6$ ................................................. G06F 11/00
[52] U.S. Cl. ................................................. 395/183.04
[58] Field of Search ........................ 395/183.04, 183.03, 395/183.07, 183.09, 183.01

[56] References Cited

U.S. PATENT DOCUMENTS

| | | | |
|---|---|---|---|
| 4,455,654 | 6/1984 | Bhaskar et al. | 371/16.2 |
| 4,868,822 | 9/1989 | Scott et al. | 371/16.2 |
| 5,053,949 | 10/1991 | Allison et al. | 395/575 |
| 5,068,852 | 11/1991 | Locke | 371/16.2 |
| 5,226,047 | 7/1993 | Catlin | 395/183.04 |
| 5,228,039 | 7/1993 | Knoke et al. | 371/16.1 |
| 5,321,828 | 6/1994 | Phillips et al. | 364/200 |
| 5,329,471 | 7/1994 | Swoboda et al. | 371/16.2 |
| 5,339,262 | 8/1994 | Rostoker et al. | 371/16.2 |

FOREIGN PATENT DOCUMENTS 4-342036  11/1992  Japan.

OTHER PUBLICATIONS

Pasternak et al "In–Circuit Emulation in ASIC Architectural Core Designs" ASIC 1989, 2nd Ann. Seminar, IEEE pp. 6–4.1–4.4.
Cravatta, "Logic Cell Emulation for ASIC in–Circuit Emulators" ASIC 1990, 3rd ann. Seminar, IEEE pp. 5–2–1–2.4.
Hasslen et al. "A Validation Strategy for Embedded Core ASICS" ASIC 1990, 3rd ann. Seminar, IEEE pp. 5–3.1–3.2.

Primary Examiner—Robert W. Beausoliel, Jr.
Assistant Examiner—Joseph E. Palys
Attorney, Agent, or Firm—Lowe, Price, LeBlanc & Becker

[57] ABSTRACT

An application system using a large scale semiconductor integrated circuit is provided with a connection. A programmable semiconductor integrated circuit is connected to the application system via the connection and an input/output terminal of the programmable semiconductor integrated circuit. The programmable semiconductor integrated circuit is provided with a microprocessor connector, to which a probe of an ICE is connected. The programmable semiconductor integrated circuit functions as a peripheral circuit contained in the large scale semiconductor integrated circuit, so that the conventional ICE can be used.

8 Claims, 6 Drawing Sheets

SEMICONDUCTOR INTEGRATED CIRCUIT FOR DEVELOPING A SYSTEM USING A MICROPROCESSOR

This application is a continuation of application Ser. No. 08/230,932 filed Apr. 21, 1994, now abandoned.

BACKGROUND OF THE INVENTION

1. Field of the Invention

The present invention relates to a semiconductor integrated circuit for developing a system using a microprocessor as well as a device for developing an application system and a method for the same, and particularly to a semiconductor integrated circuit for developing a system, a device for developing an application system and a method for the same, which are used for developing an application system using a large scale semiconductor integrated circuit provided with a microprocessor as a core as well as necessary peripheral circuits which are on-chipped on the same board as the microprocessor core.

2. Description of the Related Art

FIG. 8 is a block diagram showing contents of a system block for achieving a particular function using a microprocessor. Referring to FIG. 8, this system includes a microprocessor 10 for controlling the overall system, a ROM 22 storing a program and others for operating the microprocessor 10, a RAM 23 for storing data and others, and an interface 24 for various kinds of input and output.

For development of the application system using the microprocessor 10 shown in FIG. 8, it is generally necessary to develop and verify a hardware of the application system including the microprocessor 10 and to develop and verify a software (program) which operates on the microprocessor 10.

An In-Circuit Emulator (ICE) and a logical analyzer have been used for developing and evaluating hardware. The ICE and software debugger have been used for developing software. Among them, the ICE enables the software (program) to operate on an actual hardware of the application system. Consequently, it is possible to develop and evaluate the software (program) on the actual hardware while carrying out development and evaluation of the hardware.

FIG. 9 shows a schematic structure of the system developing device including the ICE as a major component in the prior art. The system developing device in FIG. 9 includes an application system 25 into which a microprocessor is assembled, an ICE 12 attached to a socket in which the microprocessor used in the application system 25 is to be accommodated, and a host computer 18 for operating the ICE 12 to perform a predetermined operation.

When a microprocessor used in the application system 25 is to be debugged, the ICE 12 is attached, instead of the microprocessor to be used actually, for emulating and thereby debugging the hardware and software.

Meanwhile, in accordance with increase of scale of semiconductor integrated circuits, such a large scale semiconductor integrated circuit has been developed and implemented that includes a microprocessor as a core as well as various peripheral circuits which are on-chipped on the same board as the microprocessor core and include function blocks such as those for decoding addresses, latching data and/or controlling timer, and those for controlling input/output and/or communication processing, which are selected depending on use. FIG. 5 is a schematic block diagram showing a structure of a large scale semiconductor integrated circuit. Referring to FIG. 5, the large scale semiconductor integrated circuit has an large scale semiconductor integrated circuit 1, an I/O terminal 2 of the large scale semiconductor integrated circuit 1, a microprocessor core 3, and various peripheral circuits 4 which include function blocks for decoding addresses, latching data, input/output control, communication processing and others, depending on use. For example, the microprocessor core 3 is formed of the microprocessor 10 shown in FIG. 8 in the event that the same is used as a core.

In the application system shown in FIG. 9, the microprocessor 10 is directly mounted on the application system 25. Meanwhile, in the application system using the large scale semiconductor integrated circuit shown in FIG. 5, the hardware is formed of the large scale semiconductor integrated circuit 1 containing the microprocessor core and mounted on the application system. The software (program) operates on the microprocessor core 3 contained in the large scale semiconductor integrated circuit 1.

However, the ICE which has been used for developing the microprocessor application system in the prior art is used to verify the microprocessor itself shown in FIG. 9. Hence, it does not contain various peripheral circuit 4 and also has the same outer configuration as the microprocessor as well as terminals equal in number to those of the microprocessor. Therefore, an outer size of the socket part of the ICE is generally smaller than that of the microprocessor in many cases. As a result, it is impossible to use the ICE for developing and verifying the hardware of the application system using the large scale semiconductor integrated circuit 1 which has more terminals than the microprocessor in many cases. Also, it is impossible to use the ICE for developing and verifying the software (program) on the actual hardware of the application system.

An example of an ICE overcoming the aforementioned disadvantages is disclosed in Japanese Patent Laying-Open No. 4-342036 (1992). FIG. 10A schematically shows a major portion of the ICE disclosed in the above publication, and FIG. 10B schematically shows an end of a user cable 27 shown in FIG. 10A.

Referring to FIG. 10A, a conventional ICE is attached to the application system 25 via a socket portion 26, a user cable 27 and a printed board 28. The printed board 28 is attached to the socket portion 26 via the user cable 27. An end of the user cable 27 is connected to the in-circuit emulator body (ICE body) shown in FIG. 9.

Referring to FIG. 10B, in a connection corresponding to a portion bearing the microprocessor in the system to be developed, there is provided a printed board 28 bearing a plurality of semiconductor integrated circuit devices (IC1–IC4) including a microprocessor chip corresponding to the system to be developed as well as peripheral circuit chips and various memories. The printed board 28 is connected to the ICE body via the user cable 27.

In the prior art, the ICE is constructed as described above in order to overcome the disadvantages of the ICE used for developing the microprocessor application system. However, this measures require the plurality of semiconductor integrated circuit devices (IC1–IC4) on the printed board 28, resulting in a complicated structure of the printed board 28 at the end of the ICE. Also, it is necessary to change the structure of the printed board at the end of the ICE in accordance with each system to be developed, so that the ICE must be changed according to the developing system, resulting in increase of costs.

SUMMARY OF THE INVENTION

An object of the invention is to provide an application system developing device which is inexpensive and has a simple structure.

Another object of the invention is to provide a semiconductor integrated circuit for developing a system which can be used for system development and has a simple structure.

Still another object of the invention is to provide a method which allows easy development and verification of the application system.

Yet another object of the invention is to enable easy development of an application system, which uses a large scale semiconductor circuit, with a general purpose ICE.

According to an aspect of the invention, a semiconductor integrated circuit connected to a system developing device and used for developing a system, includes a first connector for connection to a board on which a system to be developed is mounted, a second connector for connection to the system developing device, and a programmable integrated circuitry connected to the first and second connectors to have a form of one chip.

Since the system developing device and the board bearing the system to be developed are connected via the integrated circuitry in the form of one chip, it is not necessary to provide many ICs on a printed board, which are required in the prior art. Consequently, the semiconductor integrated circuit for developing a system has a simple structure.

According to another aspect of the invention, a semiconductor integrated circuit for developing a system includes a board on which the system to be developed is mounted, an input/output terminal provided at the board, and a programmable semiconductor integrated circuit connected to the input/output terminal, the programmable semiconductor integrated circuit being provided at a position opposite to the board with accommodating means for accommodating a microprocessor for the system to be developed, and a function of the programmable semiconductor integrated circuit is defined including connection to the microprocessor.

As described above, the board bearing the system and the microprocessor for the system to be developed are connected together via the programmable semiconductor integrated circuit, which is defined including connection to the microprocessor. Therefore, the microprocessor and the semiconductor integrated circuit can be connected together via a simple structure, and the system can be developed handling them as a single unit. Consequently, the semiconductor integrated circuit for developing the system having a simple structure can be provided.

According to still another aspect of the invention, there is provided an application system developing device for developing an application system (which uses a large scale semiconductor integrated circuit formed of a microprocessor core and a peripheral circuits including a plurality of function blocks). The application system developing device includes a board, a programmable semiconductor integrated circuit which is provided on the board and includes the plurality of function blocks integrated therein, connector for connecting the microprocessor core provided on the semiconductor integrated circuit, and a developing system which is connectable to the connector and includes an in-circuit emulator emulating an operation of the microprocessor, whereby the application system developing device is operable to develop and verify a hardware and a software of the application system using the large semiconductor integrated circuit which contains the microprocessor core.

As described above, the programmable semiconductor integrated circuit is mounted on the board, and the ICE which emulates the operation of the microprocessor for the system to be developed is connected thereto for developing and verifying the hardware and software of the application system. The peripheral circuits, which are provided in addition to the microprocessor for the system to be developed, have a form of a single integrated unit and are included in the semiconductor integrated circuit, which also includes the microprocessor connection to be connected to the ICE so as to perform development of the software and hardware. Therefore, development of a new system does not requires a new ICE and can be done with a conventional ICE. Consequently, the application system developing device is inexpensive.

According to further another aspect of the invention, there is provided a method of developing an application system which uses a large scale semiconductor integrated circuit formed of a microprocessor core and a peripheral circuit including a plurality of function blocks. The method includes the steps of preparing a programmable semiconductor integrated circuit which can be attached to an in-circuit emulator used for developing the application system, and defining a circuit structure of the programmable semiconductor integrated circuit to have functions equivalent to those of the peripheral circuit, whereby a hardware and a software of the application system using the large scale semiconductor integrated circuit are developed and verified.

In the method of developing the application system using the large scale semiconductor integrated circuit according to the above aspect, there is prepared the programmable semiconductor integrated circuit which can be attached to the ICE used for developing the application system, and development and verification of the application system can be carried out only by predetermined definition of the semiconductor integrated circuit. Consequently, the invention can provides the method of developing the application system which allows more easy development and verification of the application system.

The foregoing and other objects, features, aspects and advantages of the present invention will become more apparent from the following detailed description of the present invention when taken in conjunction with the accompanying drawings.

DESCRIPTION OF THE PREFERRED EMBODIMENT (1) First Embodiment

An embodiment of the invention will be described below with reference to the drawings.

Figure 1:
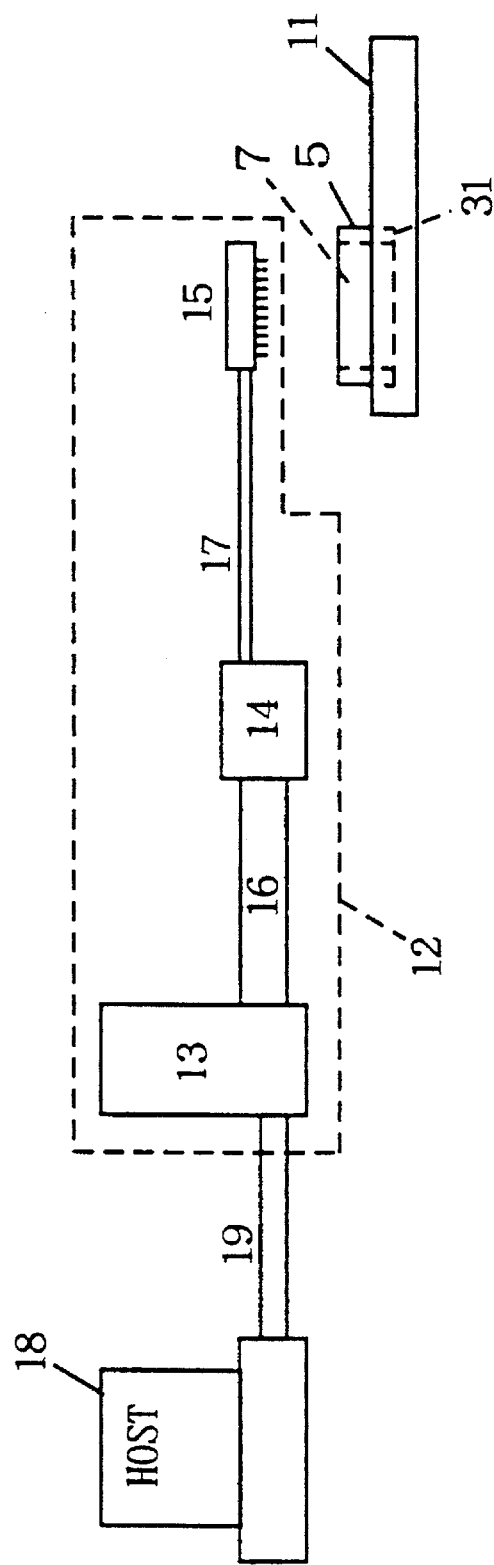
FIG. 1 schematically shows an overall structure of an application system developing device to which the invention is applied.

Referring to FIG. 1, an application system 11 using a large scale semiconductor integrated circuit is provided with a connection 31. A programmable semiconductor integrated circuit 5 is attached to the application system 11 using the large scale semiconductor integrated circuit by means of the connection 31 and an I/O terminal 6 (see FIG. 3) of the semiconductor integrated circuit 5. On a top surface of the programmable semiconductor integrated circuit 5, there is provided a microprocessor connector 7 to which a microprocessor to be developed is attached.

An ICE 12 includes an ICE body 13 used for debugging the microprocessor to be actually developed, a pod 14 selected in accordance with the microprocessor connected to the ICE body 13, and a probe 15 connected to the pod 14. Debugging of the microprocessor is enabled by connecting the probe 15 to the microprocessor connector 7. The ICE body 13 and the pod 14 are connected together via a connection cable 16, and the pod 14 and the probe 15 are connected together via a connection cable 17.

The pod 14 forms a block which emulates an operation of the microprocessor. The probe 15 forms a block which is actually attached to an application system (target system). A host computer 18 is a personal computer, a workstation or the like. The host computer 18 and the ICE 12 are connected together via a connection cable 19, through which data is sent and received according to a method utilizing, for example, RS232C or GP-1B.

Figure 2:
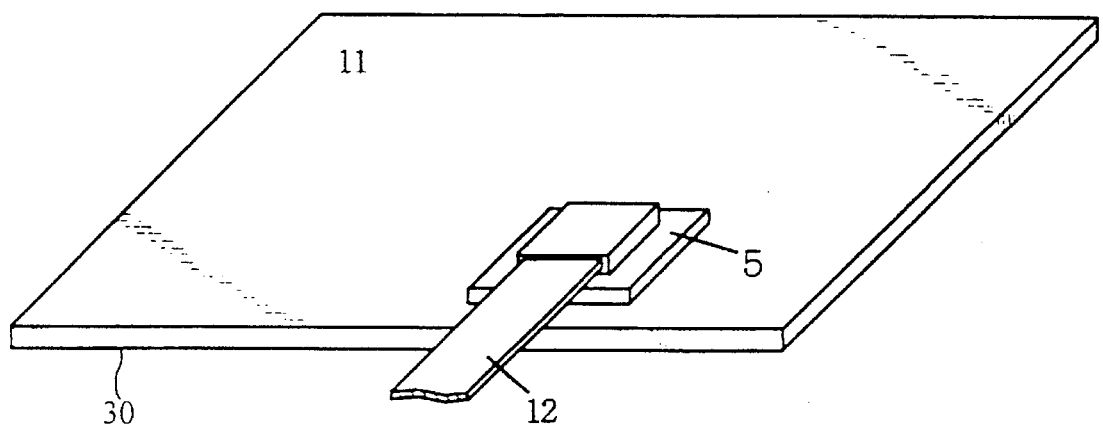
FIG. 2 shows a manner for connecting a programmable semiconductor integrated circuit according to the invention to an ICE.

FIG. 2 is a perspective view showing the application system 11, formed on board 30, using the large scale semiconductor integrated circuit shown in FIG. 1 and the ICE 12 connected thereto. On the application system 11 using the large scale semiconductor integrated circuit, there are mounted, in addition to the large scale semiconductor integrated circuit, various semiconductor integrated circuits, capacitors, resistors and a power supply circuit which are selected in accordance with the use and are not shown in the figure.

Figure 3:
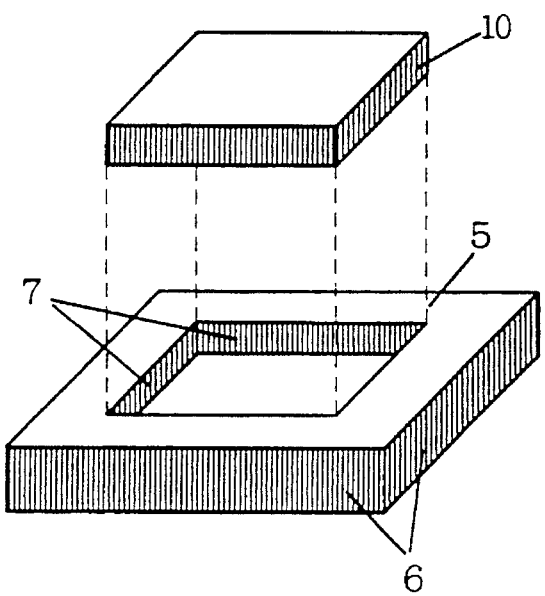
FIG. 3 schematically shows a programmable semiconductor integrated circuit according to the invention.

FIG. 3 schematically shows an appearance of the programmable semiconductor integrated circuit 5 according to the invention. As shown in FIG. 3, the programmable integrated circuit 5 is rectangular in shape. Referring to FIG. 3, the semiconductor integrated circuit 5 includes an I/O terminal 6 provided at the outer surface of the rectangular integrated circuit 5 for mounting the programmable semiconductor integrated circuit 5 on the application system 11, and a microprocessor connector 7 provided at the concave center of the integrated circuit 5 for accommodating the microprocessor 10, which is attached to the semiconductor integrated circuit 5 in a manner shown in FIG. 3. The I/O terminal 6 is used also in an operation for defining a circuit structure of the semiconductor integrated circuit 5 by writing the program.

As shown in FIGS. 2 and 3, the probe 15 of the ICE 12 is connected using the microprocessor connector 7, on which the microprocessor 10 to be developed is mounted, for debugging the microprocessor.

Figure 4:
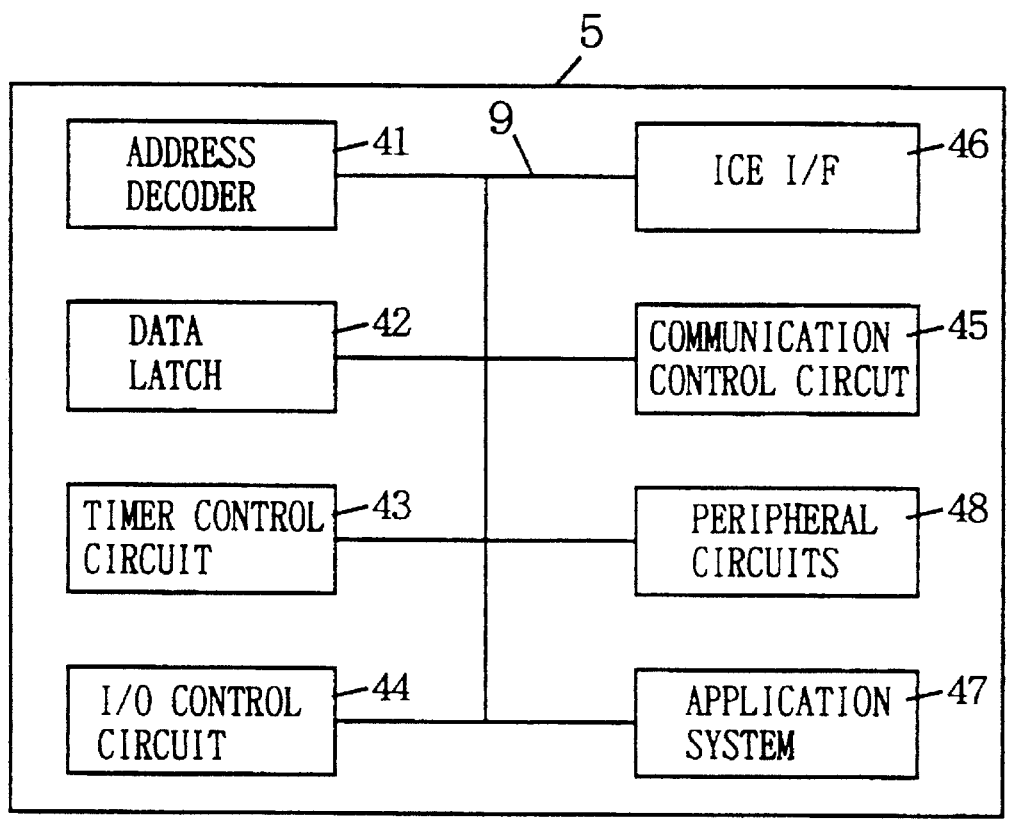
FIG. 4 is a block diagram showing an internal structure of a programmable semiconductor integrated circuit.

FIG. 4 is a block diagram showing an example of an internal structure of the programmable semiconductor integrated circuit 5 shown in FIG. 3. Referring to FIG. 4, the programmable semiconductor integrated circuit 5 includes an address decoder 41, a data latch 42, a timer control circuit 43, an I/O control circuit 44, a communication control circuit 45, an ICE interface 46, an application system interface 47 and/or other peripheral circuits 48, if necessary. The peripheral circuits 48 are connected together via a signal line group 9.

In the programmable semiconductor integrated circuit 5 shown in FIG. 3, the microprocessor 10 to be used in the application system is attached to the microprocessor connector 7 provided for accommodating the microprocessor 10, whereby the programmable semiconductor integrated circuit 5 according to the invention can be used to accomplish functions such as decoding data, latching data and timer control.

Figure 5:
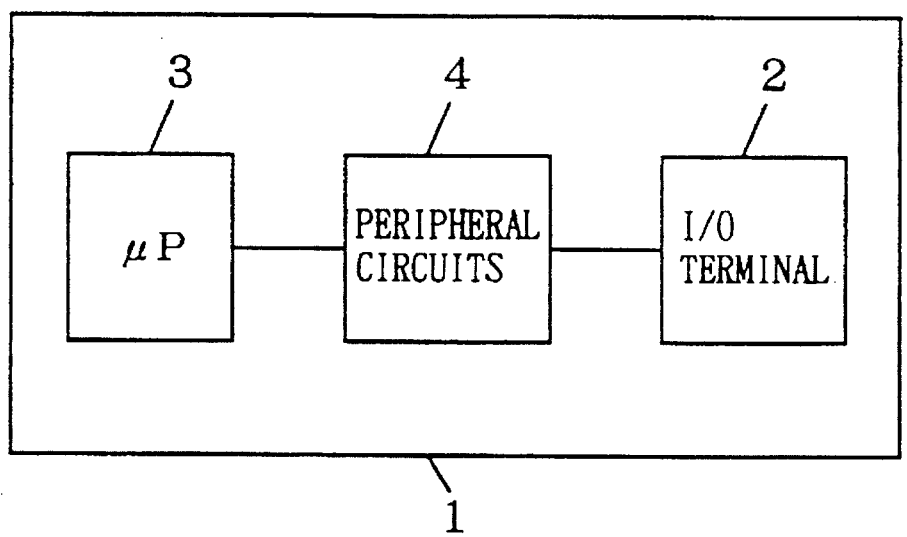
FIG. 5 is a block diagram showing a large scale semiconductor integrated circuit.

A specific method of developing the application system will be described below. FIG. 5 schematically shows a structure of the large scale semiconductor integrated circuit 1. Referring to FIG. 5, the large scale semiconductor integrated circuit 1 includes the microprocessor core 3 and peripheral circuits 4 which corresponds to the programmable semiconductor integrated circuit 5 and includes function blocks for decoding addresses, latching data, controlling a timer as well as functions blocks for input/output control, communication processing and/or others. The large scale semiconductor integrated circuit 1 further includes the I/O terminal 2 disposed around the microprocessor core 3 and the peripheral circuits 4. The application system using this large scale semiconductor integrated circuit 1 is provided with the large scale semiconductor integrated circuit 1 including the built-in microprocessor core 3. The software, i.e., program operates on the microprocessor core 3 contained in the large scale semiconductor integrated circuit 1.

According to the invention, the application system using the large scale semiconductor integrated circuit 1 shown in FIG. 5 is developed as follows. As shown in FIG. 5, the programmable semiconductor integrated circuit 5 is defined by writing data so that it may have functions equivalent to those of the peripheral circuits 4 contained in the large scale semiconductor integrated circuit 1 in connection with connection to the microprocessor core 3 and arrangement of the I/O terminal 2. Then, the ICE 12, (which emulates the operation of the microprocessor 10 corresponding to the microprocessor core 3 contained in the large scale semiconductor integrated circuit 1), is accommodated in the microprocessor connector 7 provided for accommodating the microprocessor 10 shown in FIG. 3. Thereby, the hardware of the application system 11 using the large scale semiconductor integrated circuit can be developed and verified. Also, it is possible to develop and verify the software (program) to be operated by the microprocessor core 3 on the actual hardware of the application system 11 using the large scale semiconductor integrated circuit. Definition of the program is carried out, for example, by charging/discharging the electric charges in the programmable semiconductor integrated circuit 5 with a ROM writer and cutting interconnections.

A plurality of programmable semiconductor integrated circuits 5 of various circuit scales may be prepared in accordance with the appearance and structure shown in FIGS. 2 and 3, so that different scales of the peripheral circuits which depend on the use and are contained in the large scale semiconductor integrated circuit 1 can be handled. Various programmable semiconductor integrated circuits 5 having pins of different numbers may be prepared, in which case the large scale semiconductor integrated circuits 1 including pins of different numbers can be handled. Further, various programmable semiconductor integrated circuits 5 having different types of packages such as DIP, QFP, PGA and LCC may be prepared, whereby the large scale semiconductor integrated circuits 5 having different types of packages can be handled.

Various microprocessor connectors 7 having different configurations for accommodating the microprocessor 10 of the programmable semiconductor integrated circuit 5 may be prepared, so that microprocessors having different configurations and/or pin numbers can be handled. The programmable semiconductor integrated circuit 5 does not internally include a circuit which depends on the type of microprocessor 10. Consequently, the microprocessor connector 7 of a certain type can be used for different types of microprocessor 10 and microprocessor cores 3 only by changing the program of the programmable semiconductor integrated circuit 5, provided that the microprocessor connector 7 of the same configuration and pin number is used.

The internal circuits of the programmable semiconductor integrated circuit 5 may be defined by writing to have the functions which directly connect the microprocessor connector 7 to the I/O terminal 6 for mounting the microprocessor on the application system 11, whereby the only configurations of the microprocessor can be changed.

(2) Second Embodiment

Figure 6:
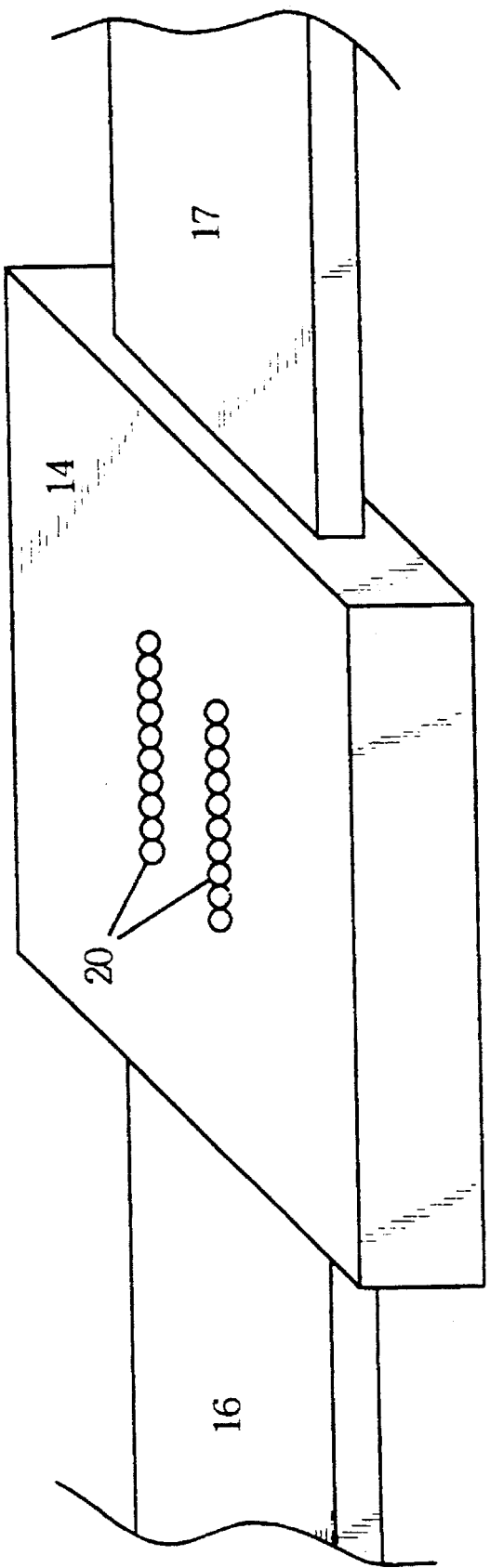
FIG. 6 schematically shows a pod of a second embodiment of the invention.

FIG. 6 shows a second embodiment of the invention, in which the invention is applied to the pod of the ICE. Referring to FIG. 6, the pod 14 of the ICE is connected to the ICE body 13 and probe 15 via connection cables 16 and 17, respectively (see FIG. 1). In the second embodiment, the pod 14 is provided with a connector 20 for accommodating the programmable semiconductor integrated circuit. In the large scale semiconductor integrated circuit 1 shown in FIG. 5, the pod shown in FIG. 6 can be used, if the scale of the peripheral circuits 4 is relatively small, and the number of terminals and the configuration of the large scale semiconductor integrated circuit 1 are equal to those of the microprocessor core 3. In this case, the operation of the large scale semiconductor integrated circuit 1 can be emulated easily. More specifically, the programmable semiconductor integrated circuit is defined by writing to perform the functions equivalent to those of the peripheral circuits in FIG. 5, and is attached to the connector 20 for the programmable semiconductor integrated circuit provided at the pod 14 shown in FIG. 6. Further, the connection between the connector 20 and the microprocessor 10 to be emulated by the pod 14 is defined to be equivalent to the connection between the microprocessor core 3 and the peripheral circuit 4. Thereby, the pod 14 shown in FIG. 6 enables emulation of the large scale semiconductor integrated circuit 1 shown in FIG. 5. As a result, the pod 14 shown in FIG. 6 can be applied to the development and verification of the hardware of the application system 11 as well as the development and verification of the software (program) on the actual hardware of the application system. Also in this case, the program is defined similarly to the first embodiment.

(3) Third Embodiment

In the ICE shown in FIG. 1, the pod 14 or ICE body 13 contains the programmable semiconductor integrated circuit, and the operation is programmed in accordance with the software (program) which operates on the microprocessor core, whereby the effect similar to that of the second embodiment can be obtained.

Figure 7:
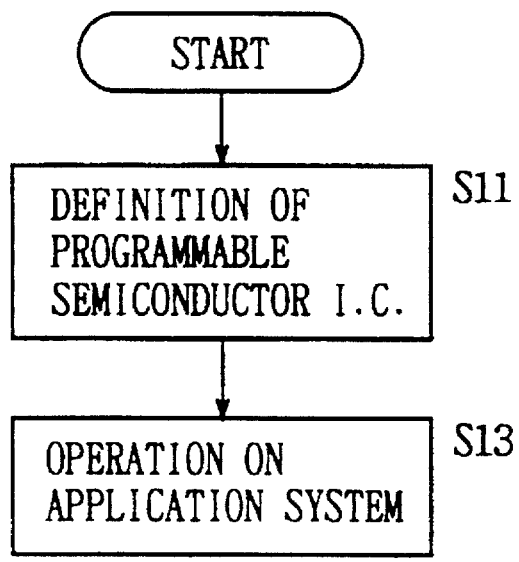
FIG. 7 is a flow chart of a program to be operated on a microprocessor core in a third embodiment of the invention.
Figure 8:
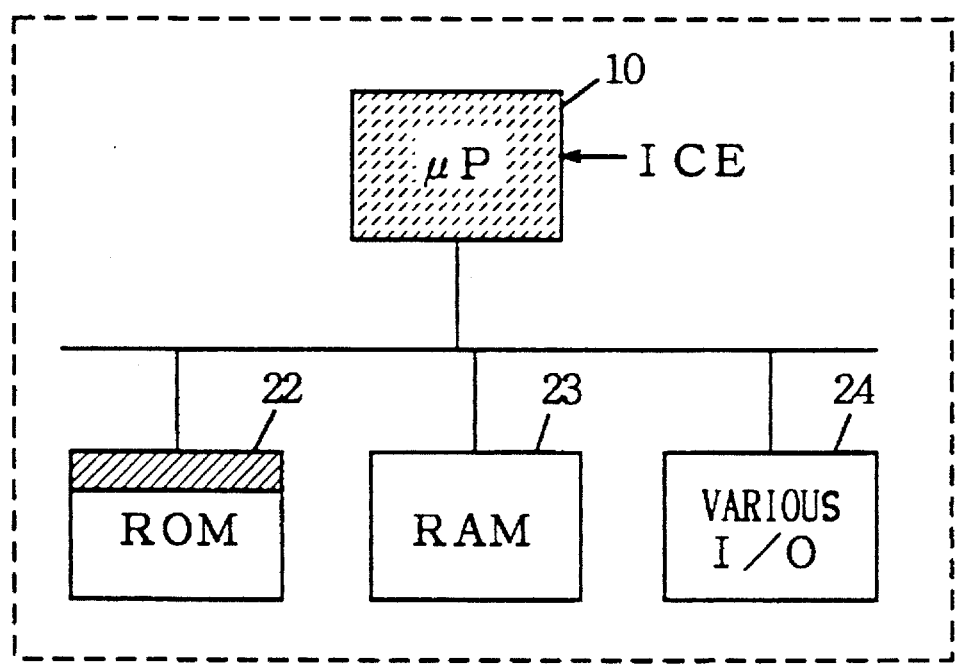
FIG. 8 is a block diagram of a system using a microprocessor.
Figure 9:
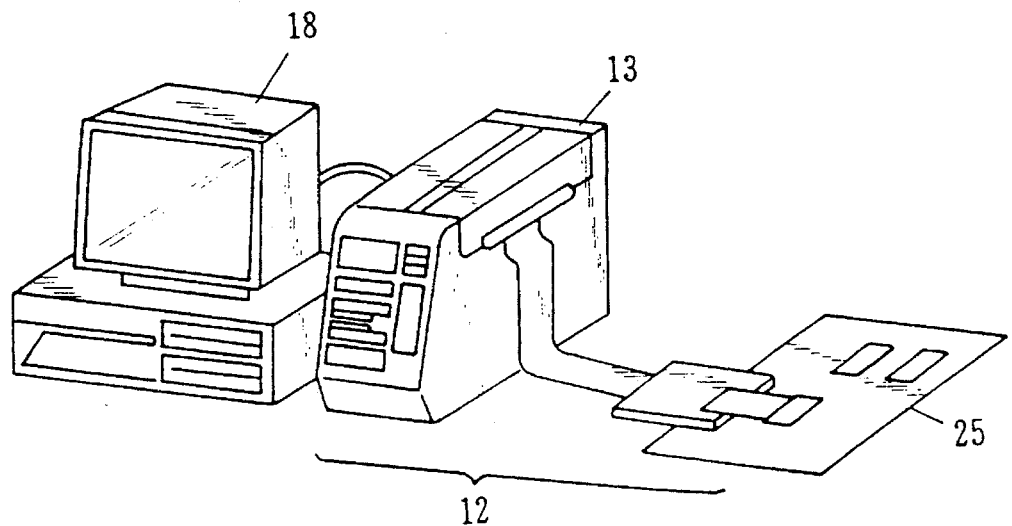
FIG. 9 schematically shows a system developing device using an ICE.
Figure 10A:
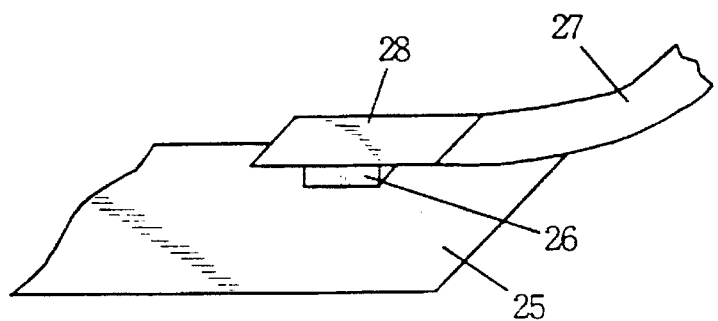
FIGS. 10A and 10B schematically show a structure of an ICE in the prior art.
Figure 10B:
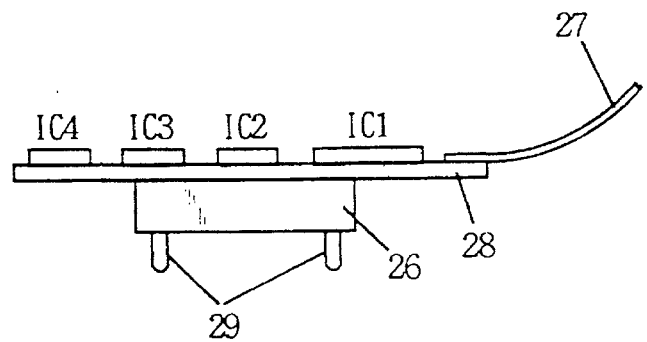

FIG. 7 is a flow chart in the case where the ICE of this embodiment is used to debug the program to be operated on the microprocessor core 3 contained in the large scale semiconductor integrated circuit 1. Referring to FIG. 7, the software (program) which operates on the microprocessor core 3 defines the programmable semiconductor integrated circuit 5 to be equivalent to the peripheral circuits 4 contained in the large scale semiconductor integrated circuit 1 prior to processing on the actual application system 11 (step S11). Thereafter, a general software (program) processing is carried out (step S13). Thereby, the application system 11 using the large scale semiconductor integrated circuit can be developed and verified. The aforementioned steps also enables development and verification of the software (program) to be operated by the microprocessor core 3 on the actual hardware of the application system 11.

(4) Fourth Embodiment

In a fourth embodiment, the pod 14 or the ICE 13 containing the programmable semiconductor integrated circuit, as stated in the embodiment 3 transmits data to and from the host computer 18 via the connection cable 19, ICE body 13 and connection cable 16 or via the connection cable 19, whereby the structure of the programmable semiconductor integrated circuit is defined to be equivalent to that of the peripheral circuits 4 contained in the large scale semiconductor integrated circuit 1. Thereby, the hardware of the application system using the large scale semiconductor integrated circuit 1 can be developed and verified. This also enables the development and verification of the software (program) to be operated by the microprocessor core on the actual hardware of the application system.

(5) Fifth Embodiment

In a fifth embodiment, the pod 14 or ICE body 13 shown in FIG. 1 contains the programmable semiconductor integrated circuit, and the use and disuse of the built-in programmable semiconductor integrated circuit 5 is selected. Specifically, the selection may be carried out by a selector switch or by a software. Thereby, the target to be emulated by the ICE can be selected from the large scale semiconductor integrated circuit 1 and the general microprocessor 10. Thereby, the ordinary microprocessor 10 and the large scale semiconductor integrated circuit 1 containing the microprocessor core can be handled by one set of ICE. Consequently, the hardware of various application systems can be developed and verified. Further, it is possible to develop and verify the software (program) to be operated by the microprocessor on the actual hardware of the application system, as well as the software (program) to be operated on the microprocessor core contained in the large scale semiconductor integrated circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit having a predetermined number of I/O terminals, connected to a system developing device and used for developing a system having a large scale semiconductor integrated circuit including a microprocessor core, peripheral circuitry and an input/output terminal, said microprocessor core having a different number of I/O terminals than said semiconductor integrated circuit, comprising:

first connecting means for connection to a board on which a system to be developed is mounted;

second connecting means for connecting said system developing device to said first connecting means; and programmable integrated circuit means connected to said first and second connecting means and including means for implementing logic included in the large scale semiconductor integrated circuit, said means for implementing logic have a different number of I/O terminals, wherein said programmable integrated circuit means enables said predetermined number of I/O terminals of the semiconductor integrated circuit to be connected with the different number of I/O terminals of the means for implementing logic.

2. The semiconductor integrated circuit according to claim 1, wherein said programmable integrated circuit means has four outer side surfaces defining a square shape, and said first connecting means is provided at said four side surfaces.

3. The semiconductor integrated circuit according to claim 1, wherein said programmable integrated circuit means has a concave at its center, and said second connecting means is provided in said concave.

4. The semiconductor integrated circuit according to claim 1, wherein said first and second connecting means are connected to each other.

5. Apparatus for developing an application system using a large scale semiconductor integrated circuit having a predetermined number of I/O terminals and including a microprocessor core and peripheral circuitry formed of a plurality of function blocks, said apparatus comprising:

an in-circuit emulator (ICE) for developing said application system and having a different number of I/O terminals than said microprocessor core, and a pod connected to said ICE; wherein said pod includes connecting means for connecting to said large scale semiconductor integrated circuit enabling the predetermined number of I/O terminals of the large scale semiconductor integrated circuit to be connected with the different number of I/O terminals of the in-circuit emulator.

6. An in-circuit emulator (ICE) having predetermined number of I/O terminals for developing an application system having a large scale semiconductor integrated circuit having a different number of I/0 terminals than said in-circuit emulator, comprising:

a pod and a connection means connected to said pod and adapted to be connected to a board bearing the system to be developed, said pod being provided with a removable programmable semiconductor integrated circuit, and means for selecting operation and non-operation of said programmable semiconductor integrated circuit, wherein said connection means enables the predetermined number of I/O terminals of the in-circuit emulator to be connected with the different number of I/O terminals of the large scale semiconductor integrated circuit.

7. Apparatus for developing an application system using a large scale semiconductor integrated circuit having a predetermined number of I/O terminals, and including a microprocessor core and peripheral circuitry formed of a plurality of function blocks, said apparatus comprising:

a board on which said application system to be developed is mounted;

a programmable semiconductor integrated circuit provided on said board and including said plurality of function blocks integrated therein;

connecting means provided on said board for connecting said microprocessor core to said programmable semiconductor integrated circuit; and a developing system connected to said connecting means and including an in-circuit emulator having a different number of I/O terminals different than said large scale semiconductor integrated circuit, emulating an operation of said microprocessor core, said apparatus being operable to develop and verify a hardware and a software of said application system, wherein the programmable semiconductor integrated circuit enables the predetermined number of I/O terminals of the microprocessor core to be connected with the different number of I/O terminals of the in-circuit emulator.

8. An application system developing device for developing an application system which uses a large scale semiconductor integrated circuit formed of a microprocessor core and a peripheral circuit including a plurality of devices comprising:

a board on which said application system to be developed is mounted;

a plurality input/output terminals provided at said board; and a programmable semiconductor integrated circuit connected to said plurality of input/output terminals, wherein said programmable semiconductor integrated circuit is provided at a position facing said board with means for accommodating a microprocessor for said system to be developed, said microprocessor for said system to be developed having a different number of input/output terminals than said plurality of input/output terminals provided at said board, and a function of said programmable semiconductor integrated circuit is defined by factors including connection to said microprocessor and connection to said board to enable the plurality of input/output terminals of provided at the board to be connected with the different number of input/output terminals of the microprocessor for said system.

* * * * *